United States Patent [19]

Hager

[11] Patent Number: 5,037,618
[45] Date of Patent: Aug. 6, 1991

[54] OXIDATION CHAMBER

[75] Inventor: Donald G. Hager, Tucson, Ariz.

[73] Assignee: Peroxidation Systems, Inc., Tucson, Ariz.

[21] Appl. No.: 509,337

[22] Filed: Apr. 13, 1990

[51] Int. Cl.$^5$ .............................................. B01J 19/08
[52] U.S. Cl. .................... 422/186.03; 422/24; 422/186.07; 422/186.11; 422/905; 250/432 R; 250/436; 250/461.1
[58] Field of Search ................ 422/186.03, 24, 186.07, 422/186.11, 905; 250/432 R, 436, 461.1

[56] References Cited

U.S. PATENT DOCUMENTS

| | | | |
|---|---|---|---|
| 4,179,616 | 12/1979 | Coviello et al. | 250/527 |
| 4,274,970 | 6/1981 | Britzel | 210/748 |
| 4,897,246 | 1/1990 | Peterson | 422/186.3 |
| 4,952,376 | 8/1990 | Peterson | 422/186.3 |

OTHER PUBLICATIONS

Hack's Chemical Dictionary, pp. 944 and 946, 4th Ed., Julius Grant, Copyright 1969, McGraw-Hill.

Primary Examiner—Stephen J. Lechert, Jr.
Assistant Examiner—N. Bhat
Attorney, Agent, or Firm—Daniel C. McKown

[57] ABSTRACT

A series of staggered baffles defines a serpentine flow path consisting of a number of segments through the oxidation chamber. Within each segment, a group of high intensity ultraviolet lamps is mounted, and a reagent inlet is provided at the upstream end of each segment, thereby permitting the processing of a liquid containing a hazardous compound through a sequence of chemical reactions carried out in the presence of intense ultraviolet radiation within the various segments of the flow path. Within each segment a different reagent may be used along with a different intensity of ultraviolet radiation.

9 Claims, 2 Drawing Sheets

OXIDATION CHAMBER

BACKGROUND OF THE INVENTION

1. Field of the Invention

The present invention is in the field of hazardous liquid waste disposal, and more specifically relates to the structure of an oxidation chamber through which the liquid is conducted and in which the liquid is subjected to the combined action of hydrogen peroxide and intense ultraviolet radiation for the purpose of breaking down the hazardous molecules into simpler and safer compounds.

2. The Prior Art

In U.S. patent application Ser. No. 07/405,206, now U.S. Pat. No. 4,952,376 filed Sept. 11, 1989, titled Oxidation Chamber and assigned to the assignee of the present invention, there was described an oxidation chamber intended for the same general purpose, but differing in certain significant ways. In this earlier chamber the baffles used to define the flow path through the chamber were perpendicular to the ultraviolet lamps. The lamps extended the length of the chamber through oversize holes in the baffles. Unfortunately, when the chamber was operated at high pressure and high flow rates, some of the liquid flowed through the oversize holes, taking a shortcut to the outlet and thereby avoiding the full measure of treatment intended.

A second limitation of the earlier chamber was that the serpentine flow path of the liquid passed back and forth over the banks (A, B, C) of lamps in the sequence A B C B A B C making it impossible to provide a graded or progressively increasing intensity of ultraviolet radiation as seen by the liquid.

In the earlier chamber, particularly in some embodiments, it was necessary to use headers to conduct the liquid to a particular region within the chamber and/or to introduce the liquid uniformly across the flow path. The headers added to the cost and complexity of the chamber, but more importantly, they took up valuable space within the chamber. As will be seen below, the elimination of the headers in the present invention permits an additional bank of lamps to be installed in the chamber.

Further, at least for chambers having the same general proportions as the chamber actually used, the baffling arrangement results in increased flow path length compared to the earlier chamber configuration. Assuming the same volumetric flow rate in each chamber, the liquid in the chamber of the present invention flows considerably faster. The greater velocity results in more turbulence and better mixing, which promote the treatment process.

As will be described more fully below, the foregoing are the main ways in which the present invention improves on the earlier chamber.

SUMMARY OF THE INVENTION

In the oxidation chamber of the present invention a number of tubular-shaped ultraviolet lamps are mounted so as to extend in the lengthwise direction of the chamber and parallel to one another. The lamps are arranged in several groups or bays with the second group above the first group, the third group above the second group, etc.

In accordance with the present invention, these groups of lamps are separated by horizontal baffles that also extend lengthwise within the chamber. The baffles are interdigitated so as to form a serpentine flow path that winds past each bank of lamps in succession. This makes it practical to provide different levels of ultraviolet radiation intensity at successive portions of the flow path; for example, a steadily increasing intensity.

Because the liquid never flows twice through the same segment of the flow path, it is possible to carry out a succession of different chemical reactions in the various segments of the flow path, by introducing different reagents at the beginning of certain segments and employing in each of those segments the optimum intensity of ultraviolet radiation.

Because the lamps do not extend through the baffles, there is no possibility that the liquid will bypass a portion of the flow path by flowing through the holes in the baffle that surrounds the lamps.

In some embodiments of the earlier chamber the flow path was short but broad for the purpose of producing a low flow rate. This type of flow required a special distributor (called a header) within the chamber to assure that the liquid would be supplied more or less uniformly across the width of the flow path. In comparison, the flow path formed by the baffles in the chamber of the present invention is much longer and much smaller in cross section. There is no concern about supplying the liquid uniformly across the smaller cross section, and as a result the headers are not used. The space occupied by the headers in the earlier chamber is used in the present invention to provide an additional bank of lamps.

As mentioned above, the smaller cross sectional area of the flow path in the present invention results in greater flow velocity. Greater flow velocity results in more turbulence and better mixing of reagents with the liquid, thereby increasing the efficiency of the reactions.

In the earlier chamber, compared to the present invention, the wall area perpendicular to the lamp length was minimized because the baffling was perpendicular to the lamp length. This design reduced the amount of UV light that might reach the oxidation chamber walls and be absorbed. This is of particular concern with higher output lamps and non-absorbing water in regard to UV light.

The present invention design results in a higher wall area parallel to the lamp lengths. To offset possible inefficiencies due to UV absorbance (loss) on the walls of the chamber, the present invention embodies a UV reflective surface on the walls parallel to the lamps. This surface can be comprised of separate panels affixed to the chamber or a coating applied to the oxidation chamber wall. The composition of the panels or coating is selected for several properties which include UV reflectivity, corrosion resistance, abrasion resistance, ease of application and installation.

The novel features which are believed to be characteristic of the invention, both as to organization and method of operation, together with further objects and advantages thereof, will be better understood from the following description considered in connection with the accompanying drawings in which a preferred embodiment of the invention is illustrated by way of example. It is to be expressly understood, however, that the drawings are for the purpose of illustration and description only and are not intended as a definition of the limits of the invention.

DETAILED DESCRIPTION OF THE PREFERRED EMBODIMENT

Figure 1:
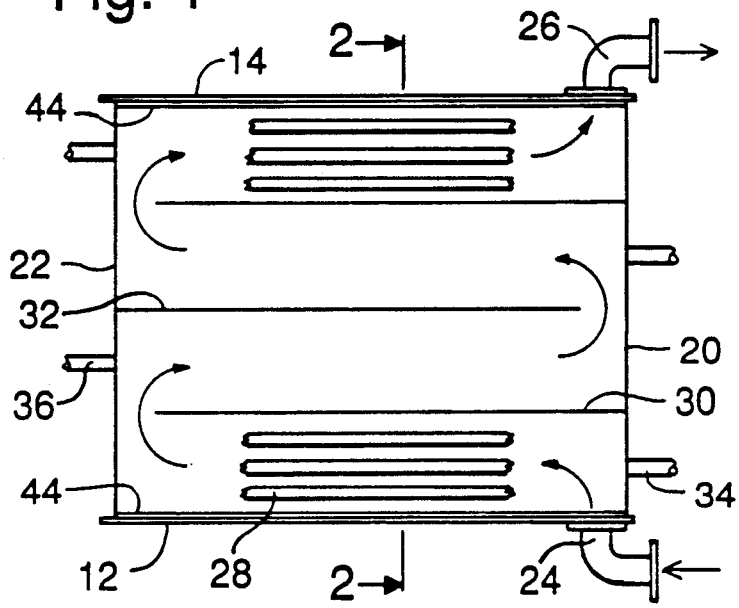
FIG. 1 is a diagram showing a side elevational aspect of a preferred embodiment of the present invention.
Figure 2:
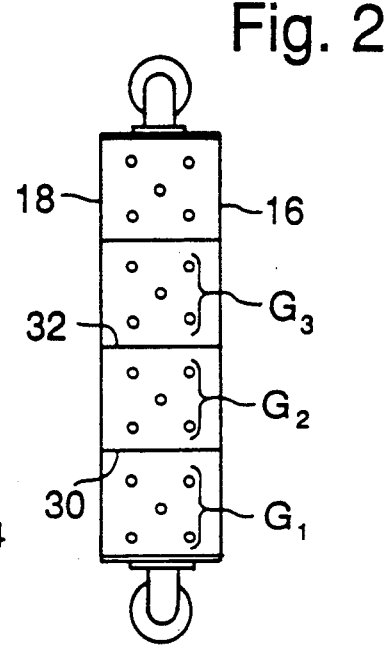
FIG. 2 is a diagram showing a cross sectional view in the direction 2—2 indicated in FIG. 1.
Figure 3:
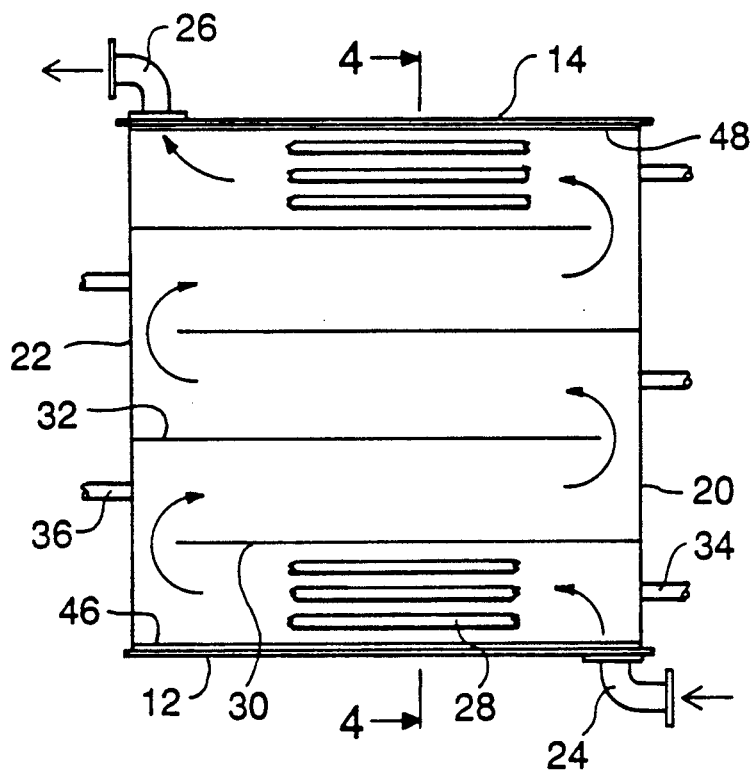
FIG. 3 is a diagram showing a side elevational aspect of an alternative embodiment of the present invention.
Figure 4:
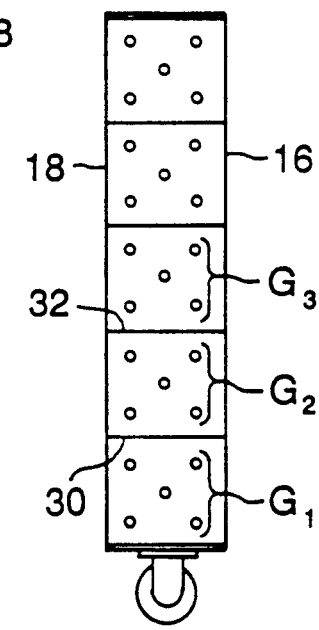
FIG. 4 is a diagram showing a cross sectional view in the direction 4—4 indicated in FIG. 3.
Figures 5, 6:
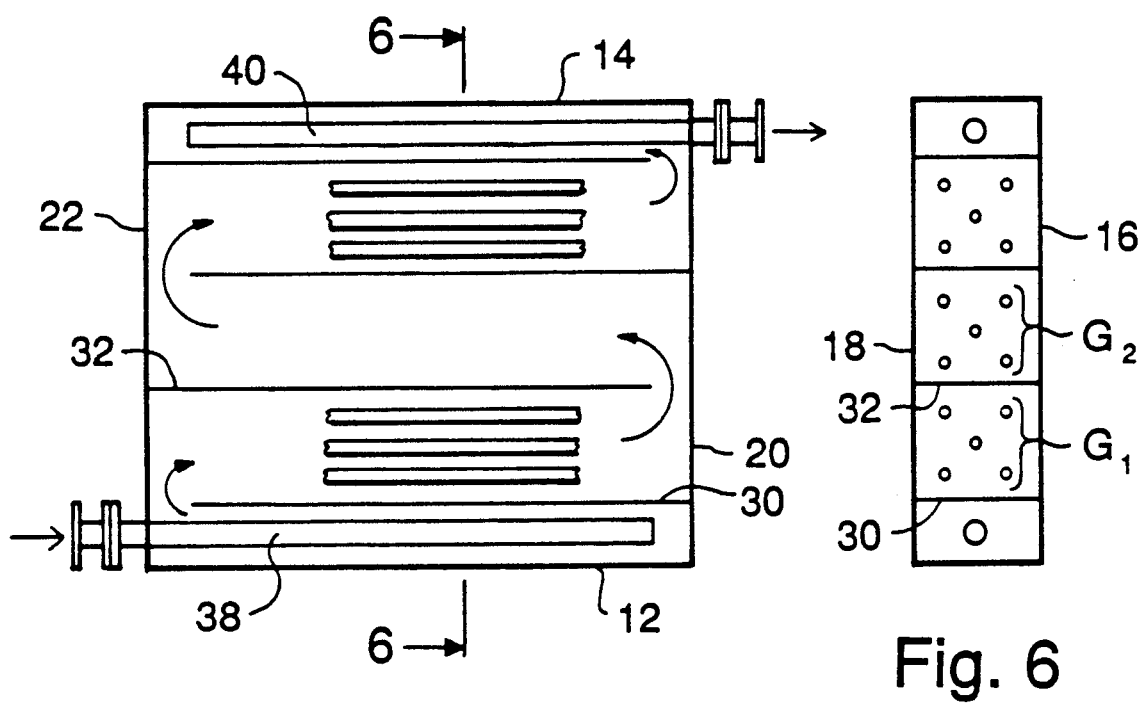
FIG. 5 is a diagram showing a side elevational aspect of a second alternative embodiment of the present invention; and, FIG. 6 is a diagram showing a cross sectional view in the direction 6—6 indicated in FIG. 5.

Turning now to the drawings in which like parts are denoted by the same numeral throughout, there is shown in FIGS. 1 and 2 a preferred embodiment of the invention. FIGS. 3 and 4 show an alternative embodiment, and FIGS. 5 and 6 show a second alternative embodiment. Numerous practical details have been omitted from the drawings in the interest of clarity.

The oxidation chamber is a box-like structure that includes a bottom wall 12, a top wall 14, a front wall 16, a rear wall 18, a first end wall 20, and a second end wall 22.

The liquid to be treated is forced under pressure to enter the chamber through the inlet port 24. After treatment within the chamber, the treated liquid flows from the chamber through the outlet port 26.

Within the chamber, a first group $G_1$ of ultraviolet lamps, of which the lamp 28 is typical, extends lengthwise in the chamber, and in the preferred embodiment extends from the first end wall 20 to the second end wall 22, and the individual lamps are parallel to the bottom wall 12 and to the front wall 16. $G_1$ denotes the lowest group of lamps in the chamber, and successive groups $G_2 \ldots G_N$ are located progressively higher in the chamber.

In the preferred embodiment, the tubular ultraviolet lamps are oriented in the direction of flow, but in other embodiments the lamps are oriented perpendicular to the direction of flow, i.e., perpendicular to the plane of the drawings of FIGS. 1, 3, and 5.

In accordance with the present invention, the first group $G_1$ of lamps is separated from the second group $G_2$ of lamps by a first baffle 30 that extends parallel to the bottom wall from the first end wall 20 toward the second end wall 22, but that terminates short of the second end wall 22. In turn, the second group $G_2$ of lamps is separated from the third group $G_3$ by a second baffle 32 that extends parallel to the bottom wall 12 from the second end wall 22 toward the first end wall 20, but that terminates short of the first end wall 20.

As shown in FIGS. 1, 3, and 5, the first, third, and odd-numbered baffles extend from the first end wall 20 but terminate short of the second end wall 22, while the even-numbered baffles extend from the second end wall 22 but terminate short of the first end wall 20. The baffles may thus be said to be staggered, or interdigitated, for the purpose of defining a serpentine flow path within the chamber. The curved arrows within the chamber indicate the direction of flow of the liquid.

It is seen that the liquid flows past the first group $G_1$ of lamps as it moves along the first segment of the serpentine path, and then flows past the second group $G_2$ of lamps as it flows along the second segment of the serpentine path, etc.

A reagent inlet 34 is provided at the upstream end of the first segment, and a second reagent inlet 36 is provided at the upstream end of the second segment. In general, a reagent inlet is provided at the upstream end of each segment of the serpentine path. These reagent inlets permit a reagent, such as hydrogen peroxide, to be introduced under pressure to the liquid to be treated.

Clearly, the number of lamps in each of the groups may be altered, so that the intensity of the ultraviolet radiation is different in the various segments of the flow path. Also, different reagents may be introduced at the upstream ends of the various segments. This permits different reactions to be carried out in sequence in successive segments of the flow path. For example, a particular hazardous compound may be broken into two or more other compounds in the first segment by action of a first reagent at a first level of ultraviolet radiation intensity. Thereafter, the products of this first reaction may be further broken down in the second segment by the combined action of a second reagent and a different intensity level of ultraviolet radiation.

In this manner, the chamber of the present invention opens up exciting new possibilities for neutralizing hazardous compounds by subjecting them to a sequence of reactions.

The embodiment of FIGS. 3 and 4 has an additional group of lamps compared to the embodiment of FIGS. 1 and 2, and the outlet port 26 is located at the opposite end of the chamber.

In the preferred embodiment of FIG. 1, efficient utilization of the ultraviolet radiation is promoted by the application of an ultraviolet reflective coating 44 to the inside face of the walls 12 and 14 and to the baffles.

In the alternative embodiment of FIG. 3, then panels 46 and 48 composed of an ultraviolet reflective material are affixed to the walls 12 and 14 to reduce absorption of the ultraviolet radiation. The baffles are composed of such material or, alternatively, they may be clad with sheets of the reflective material.

Although high reflectivity at ultraviolet wavelengths is desirable in the ultraviolet reflective material, the choice of material is not a simple matter. Other considerations, such as corrosion resistance, abrasion resistance, and ease of installation and maintenance are at least as important as the reflectivity. Thus, the search for the optimum material is an ongoing one, and the best materials found to date are TEFLON (registered trademark of E. I. Du Pont for tetrafluoroethylene) and polyvinylidene fluoride (available from Pennwalt Corp. under the registered trademark KYNAR).

The embodiment of FIGS. 5 and 6 is a hybrid between the present invention and a type of earlier chamber which used an inlet header 38 and an outlet header 40 to introduce and conduct away the liquid. However, the embodiment of FIGS. 5 and 6 differs from the earlier chamber in that, in accordance with the present invention, the baffles extend parallel to the lamps.

Thus, there has been described an oxidation chamber in which the direction of the baffles is parallel to the lamps and in which the baffles define a serpentine path consisting of a number of segments which are capable of being used to initiate successive chemical reactions useful in breaking down hazardous compounds.

The foregoing detailed description is illustrative of one embodiment of the invention, and it is to be understood that additional embodiments thereof will be obvious to those skilled in the art. The embodiments described herein together with those additional embodiments are considered to be within the scope of the invention.

What is claimed is:

1. Apparatus for subjecting a liquid to ultraviolet radiation comprising in combination:
   a chamber having a bottom wall, a top wall, a front wall, a rear wall, a first end wall and a second end wall;
   means for supplying the liquid to said chamber at a region adjacent said bottom wall;
   means for conducting the liquid from said chamber from a region adjacent said top wall;
   a number N of groups of spaced ultraviolet lamps, the successive groups disposed at successively higher levels within said chamber; and,
   a set of N−1 baffles disposed parallel to said bottom wall and spaced vertically, separating said N groups of spaced ultraviolet lamps, the lowest baffle extending from said first end wall but terminating short of said second end wall, the next baffle extending from said second end wall but terminating short of said first end wall, the remaining baffles staggered in like manner to define a serpentine path of N segments for the liquid through said chamber;
   whereby, in passing through said chamber each drop of the liquid must pass in succession the N groups of spaced ultraviolet lamps.

2. The apparatus of claim 1 further comprising in combination means located adjacent the upstream end of one of the N segments of the serpentine path for introducing a reagent to the liquid.

3. Apparatus for subjecting a liquid to ultraviolet radiation comprising:
   a chamber having a bottom wall, a top wall, a front wall, a rear wall, a first end wall and a second end wall, and having an inlet port in said bottom wall adjacent said first end wall, and having an outlet port in said top wall adjacent said first end wall;
   an even number N of groups of spaced ultraviolet lamps, the successive groups disposed at progressively higher levels within said chamber; and,
   a set of N−1 baffles, disposed parallel to said bottom wall and spaced vertically, separating said several groups of spaced ultraviolet lamps, the lowest baffle extending from said first end wall but terminating short of said second end wall, the next baffle extending from said second end wall but terminating short of said first end wall, the remaining baffles staggered in like manner to define a serpentine path of N segments for the liquid from said inlet port to said outlet port;
   whereby, in passing through said chamber, each drop of the liquid must pass in succession the N groups of spaced ultraviolet lamps.

4. The apparatus of claim 3 further comprising a reagent inlet located adjacent the upstream end of one of the N segments of the serpentine path for introducing a reagent to the liquid.

5. Apparatus for subjecting a liquid to ultraviolet radiation comprising:
   a chamber having a bottom wall, a top wall, a front wall, a rear wall, a first end wall and a second end wall, and having an inlet port in said bottom wall adjacent said first end wall, and having an outlet port in said top wall adjacent said second end wall;
   an odd number N of groups of spaced ultraviolet lamps, the successive groups disposed at progressively higher levels within said chamber; and,
   a set of N−1 baffles, disposed parallel to said bottom wall and spaced vertically, separating said several groups of spaced ultraviolet lamps, the lowest baffle extending from said first end wall but terminating short of said second end wall, the next baffle extending from said second end wall but terminating short of said first end wall, the remaining baffles staggered in like manner to define a serpentine path of N segments for the liquid from said inlet port to said outlet port;
   whereby, in passing through said chamber, each drop of the liquid must pass in succession the N groups of spaced ultraviolet lamps.

6. The apparatus of claim 5 further comprising a reagent inlet located adjacent the upstream end of one of the N segments of the serpentine path for introducing a reagent to the liquid.

7. In an oxidation chamber of the type having walls and baffles which together define a flow path for a liquid to take in flowing through the oxidation chamber, and having ultraviolet lamps disposed along the flow path to subject the flowing liquid to ultraviolet radiation, the improvement comprising:
   a layer of corrosion and abrasion resistant material applied to the walls and baffles to reflect the ultraviolet radiation, so that less of the ultraviolet radiation will be absorbed by the walls and baffles, and more of the ultraviolet radiation will be absorbed by the flowing liquid.

8. The improvement of claim 7 in which the corrosion and abrasion resistant material is tetrafluoroethylene.

9. The improvement of claim 7 in which the corrosion and abrasion resistant material is polyvinylidene fluoride.

* * * * *